United States Patent
Guo

(10) Patent No.: US 9,688,861 B2
(45) Date of Patent: Jun. 27, 2017

(54) INORGANIC DRY POWDER BUILDING COATING AND PREPARING METHOD THEREFOR

(75) Inventor: Silong Guo, Shanghai (CN)

(73) Assignee: Qiangte Energy-Saving Materials Co. Ltd., Shanghai (CN)

( * ) Notice: Subject to any disclaimer, the term of this patent is extended or adjusted under 35 U.S.C. 154(b) by 39 days.

(21) Appl. No.: 13/981,613

(22) PCT Filed: Aug. 10, 2012

(86) PCT No.: PCT/CN2012/079966
§ 371 (c)(1),
(2), (4) Date: Jul. 24, 2014

(87) PCT Pub. No.: WO2013/097464
PCT Pub. Date: Jul. 4, 2013

(65) Prior Publication Data
US 2014/0329951 A1    Nov. 6, 2014

(30) Foreign Application Priority Data
Dec. 28, 2011 (CN) .......................... 2011 1 0446699

(51) Int. Cl.
| *C09D 201/00* | (2006.01) |
| *C09D 7/12* | (2006.01) |
| *C09D 1/04* | (2006.01) |
| *C04B 28/26* | (2006.01) |
| *C09D 1/00* | (2006.01) |
| *C09D 1/02* | (2006.01) |
| C04B 111/00 | (2006.01) |
| C08K 3/22 | (2006.01) |
| C08K 3/32 | (2006.01) |
| C08K 3/34 | (2006.01) |

(52) U.S. Cl.
CPC ............... *C09D 1/04* (2013.01); *C04B 28/26* (2013.01); *C09D 1/00* (2013.01); *C09D 1/02* (2013.01); C04B 2111/00482 (2013.01); C08K 3/22 (2013.01); C08K 3/32 (2013.01); C08K 3/34 (2013.01); C08K 2003/2296 (2013.01); C08K 2003/327 (2013.01)

(58) Field of Classification Search
None
See application file for complete search history.

(56) References Cited

U.S. PATENT DOCUMENTS

| 3,883,489 A | * | 5/1975 | Matschke | C08F 261/04 524/427 |
| 4,018,616 A | * | 4/1977 | Sugahara | C01B 33/00 106/623 |
| 4,415,364 A | * | 11/1983 | Naito | C04B 28/26 106/628 |
| 6,296,699 B1 | * | 10/2001 | Jin | B28B 7/384 106/286.1 |

FOREIGN PATENT DOCUMENTS

| CN | 1887989 A | 1/2007 |
| CN | 101134854 A | 3/2008 |
| CN | 101230214 B | 7/2008 |
| CN | 101368014 A | 2/2009 |
| CN | 102173710 A | 9/2011 |
| JP | EP 0194371 A1 * | 9/1986 ............. C04B 22/16 |

OTHER PUBLICATIONS

Viala, et al. "Pigment Encapsulation by Emulsion Polymerisation Redespersible in Water" Macromolecular Symposia 187 651-661, Sep. 2002.*
Lin, Xuegui, Inorganic Construction Paint, Journal of Dalian Fisheries College, Jun. 1-15, 1995, vol. 10, No. 2, p. 69-73.
International Search Report; PCT/CN2012/079966, International File Date: Aug. 10, 2012, Qiangte Energy-Saving Materials Co., Ltd., 3 pages.

* cited by examiner

*Primary Examiner* — Christopher M Rodd
(74) *Attorney, Agent, or Firm* — Duane Morris LLP

(57) ABSTRACT

An inorganic dry powder building coating comprises inorganic gel system consisting of alkali metal silicates and hardener, organic re-dispersed emulsoid powder, and may also comprise filler, pigment and auxiliaries. The coating of the present invention has good storage stability, scrub resistance, weather resistance, and is easy to transport. No salting-out and no harmful substances, such as volatile organic compound, benzene, formaldehyde, heavy metal, appear after being solidified to perform film.

17 Claims, No Drawings

INORGANIC DRY POWDER BUILDING COATING AND PREPARING METHOD THEREFOR

FIELD OF TECHNOLOGY

The present invention relates to paint, particularly, to an inorganic dry-powdered architectural paint with good weather resistance, cleaning resistance, and without salting-out and whitening.

BACKGROUND

An architectural paint means the paint using for the exterior wall, interior wall, ceiling or floor of a building for functions of decoration, protection and improving living conditions. Currently, water-borne paint, which features prominently in the paint filed, contains water emulsion type paint and water solution type paint, with water as disperse medium. However, the percent of water in components of the water-borne paint is up to 35-55%, leading to consume a lot of manpower, material resource and financial resource to pack or transport the water-borne paint. Due to a short shelf life and storage life, high cost and special technology is required to overcome the bad storage stability, i.e. to avoid demixing and thickening during the storage.

The discovery of re-dispersible emulsion powder by Wacker Chemie AG, Germany, enables to dry-powdering the paint. Dry-powdered paint, generally, is a powder obtained from an emulsion by a special process, which changes the producing and storage mode, reduces producing cost, makes the pack and transport easy and safe, and prolongs the storage life and the shelf life. During application, it is mixed with solvent to form a alcohol or water based paint or quick-drying paint, with the advantages such as good adaptability, easy accessibility, and economization of some requisite chemical auxiliaries in common paint to resolve the environment pollution and to save resource. So that the dry-powdered paint has been widely used and developed. Among the products of architectural paint, high solid dry-powdered paint is invented earlier and it has a great practical value, such as powdered putty, powdered tile-like paint, powdered enamel paint, powdered water resistant paint and thermal insulation paint, etc. Thin-layer dry-powdered architectural paint is coated mostly by mixing with water and following roller coating or brush coating in-situ. According to the different requirement from the high solid dry-powdered paint, the thin-layer dry-powder architectural paint can be divided into two types: one is pure re-dispersible emulsion powder system and the other is a composition (inorganic dry-powder architectural paint) of re-dispersible emulsion powder with inorganic powdered material, such as gypsum, slaked lime and cement, etc.

In the dry-powder paint of pure re-dispersible emulsion powder system, the property mainly depends on the emulsion powder. The difference of film-forming performance between the re-dispersible emulsion powder and emulsion leads to the difference of the property between coatings, outstandingly being evident in cleaning resistance, aging resistance, etc. Therefore, this paint fails to large-scale application.

In inorganic dry-powdered paint, inorganic film-forming component, such as cement, lime or gypsum, is added, so that the cleaning resistance and aging resistance have been greatly improved and advanced. Meanwhile, the inorganic dry-powdered paint has the advantages of frost resistance and anti-mildew, as well as the good performances in the aspects of resistance to water washing, adhesion, waterproof, etc. Therefore, in European market, the inorganic dry-powdered paint has great important status. Chinese Patent CN100558834C discloses a green dry-powdered paint with containing re-dispersible emulsion powder and white cement as major constituent, wherein, it saves many additions usually used in emulsion paint and reduces the volatile organic compound. Chinese Patent CN101230214B discloses a cement-based dry-powdered paint consisted of white cement, re-dispersible emulsion powder and additions having functions of tile-like and noctilucent, with great durability. Chinese Patent CN102173710A discloses a gypsum-based dry-powdered paint comprising gypsum powder, white cement and PVA micro powder to resolve the bad durability of conventional paint through chemical bonding reaction.

However, due to the addition of the lime or cement and so on, soluble salts will be generated. The soluble salts may separate out onto the surface of coating under certain conditions. These salts are white, so that some lighter colour spots will appear on deep colour coating, which is known as the whitening phenomenon. Therefore, the inorganic dry-powder paint is only suitable for white or light colour coating.

SUMMARY

To overcome the defect of whitening easily occurs in the inorganic dry-powdered architectural paint, the present invention provides an inorganic dry-powdered architectural paint, which has the advantages of good cleaning resistance, weather resistance, no whitening phenomenon, and provides a method of producing the same.

The first aspect of the present invention provides an inorganic dry-powdered architectural paint, comprising inorganic gel system and re-dispersible emulsion powder.

Optionally, a pigment and/or filler can be added into the inorganic dry-powdered architectural paint.

The inorganic gel system comprises alkali metal silicate and hardening agent, wherein, the hardening agent is selected from the substances which can form a cross-linked consolidation body with the alkali metal silicate.

The alkali metal in the alkali metal silicate is one of more metal selected from IA, IIA, IIIA and IIB, IB groups in Mendeleev's periodic table. Preferably, the alkali metal silicate is one or mixture of several of sodium silicate, potassium silicate, lithium silicate.

The hardening agent, preferably, contains one or mixture of several of fluorosilicate, phosphate (including condensed phosphate), borate, metallic oxide and metal hydroxide. Wherein, the metal in the metallic oxide or metal hydroxide is one or more selected from IA, IIA, IIIA and IIB, IB groups in Mendeleev's periodic table.

Wherein, the metal in the fluorosilicate, phosphate, borate, metallic oxide or metal hydroxide is one or more selected from IA, IIA, IIIA and IIB, IB groups in Mendeleev's periodic table.

According to the inorganic dry-powdered architectural paint of the present invention, preferably, the hardening agent comprise one or mixture of several of $Al_2O_3$, ZnO, MgO, sodium fluorosilicate, potassium fluorosilicate, lithium fluorosilicate, magnesium fluorosilicate, aluminum fluorosilicate, aluminum phosphate, potassium phosphate, sodium phosphate, magnesium phosphate, condensed aluminum phosphate, aluminum borate, potassium borate, sodium borate, magnesium borate.

According to the inorganic dry-powdered architectural paint of the present invention, preferably, the re-dispersible emulsion powder is obtained from polymer emulsion by drying. The polymer can be homopolymer, binary copolymer or ternary copolymer obtained by polymerizing alkene, alkadiene, acrylic acid, acrylate ester, methacrylic acid, methacrylate ester, vinyl aliphatate ester. The vinyl aliphatate ester can be represented by R—CO—O—CH=$CH_2$, wherein, R is hydrocarbonyl, preferably is alkyl, most preferably is straight or branched C1-C20 alkyl. The example of the polymer is, such as, poly(vinyl acetate), vinyl acetate/ethylene copolymer (EVA), vinyl acetate/propylene copolymer, vinyl acetate/butadiene copolymer, vinyl acetate/styrene copolymer, styrene/butadiene copolymer, acrylate/styrene copolymer, acrylate ester/vinyl acetate/vinyl higher aliphatate ester copolymer, vinyl acetate/higher aliphatate ester copolymer, ethylene/vinyl chloride/vinyl laurate ester copolymer, vinyl acetate/ethylene/vinyl higher aliphatate ester copolymer, poly(acrylic acid), poly(acrylate ester), poly(methacrylic acid), poly(mathacrylate ester), and so on.

According to the inorganic dry-powdered architectural paint of the present invention, preferably, the pigment can be organic or inorganic pigment with white or light colour, or any other colour. The example of inorganic pigment is, such as, titanium pigment, iron oxide red, iron oxide yellow, iron oxide black, lithopone (coprecipitate of zinc sulfide and barium sulfate), carbon black, cadmium red, cadmium yellow, lead chromium yellow, chromium oxide green, iron blue, zinc oxide, cobalt blue. The example of the organic pigment is, such as, the pigment with structure of phthalocyanin, azo type pigment, the pigment with structure of quinacridinone.

According to the inorganic dry-powdered architectural paint of the present invention, the filler can be inorganic filler, preferably, containing one or mixture of several of silicon oxide, silicate salt, carbonate salt, carbide, sulfate, sulfide, nitride, metal oxide, metal hydroxide and metal; for example, silicon nitride, boron nitride, wollastonite, aluminum oxide, barium sulfate, calcium carbonate (can be light calcium carbonate or ground calcium carbonate), talcum powder, mica powder, bentonite, sierozem powder, aluminum silicate (prefer to ultra-fine aluminum silicate), quartz powder, calcite, and so on.

According to the inorganic dry-powdered architectural paint of the present invention, optionally, an auxiliary which is suitable for paint can be added, and can be any auxiliary that can improve the property of the inorganic dry-powdered architectural paint, such as defoaming agents, dispersing agent, thickening agent, wetting agent, coalescent, anti-mildew agent, hydrophobic agent.

The defoaming agent can be one or mixture of several of silicone oil, mineral oil, polyether, polyether modified silicone oil, higher aliphatic alcohol, organic phosphorus ester.

The dispersing agent can be water-soluble anionic surfactant, such as acid salt (R—COOM), sulfate salt (R—O—$SO_3M$), sulfonate salt (R—$SO_3M$); or the dispersing agent can be non-ionic surfactant, such as Y—($CH_2$—$CH_2$—O)$_n$—X; also, the dispersing agent can be homopolymer or copolymer of vinyl carboxylic acid or its ester or its salt, or copolymer of the vinyl carboxylic acid with other vinyl comonomer; or phosphate salt, such as sodium hexametaphosphate. Wherein, R is hydrocarbonyl with C5-C30 carbon chain length, prefer to straight or branched C5-C30 alkyl; X and Y can be different or same, and both X and Y are capping group which can not ionize in water, such as H, R—COO—; n is degree of polymerization.

The thickening agent can be: 1) cellulose and/or its derivatives, such as methyl cellulose, carboxymethyl cellulose, hydroxypropyl cellulose, hydroxypropyl methyl cellulose; or 2) poly(acrylic acid) and/or its derivatives, such as poly(acrylate salt), poly(methacrylic acid), poly(methacrylate salt); or 3) polyurethane associative thickening agent; or 4) inorganic thickening agent, such as bentonite.

The wetting agent can be polysiloxane, polyether modified polydimethylsiloxane, polyester modified polydimethylsiloxane, fluorinated surfactant, polyether, etc.

The anti-mildew agent can be: 1) quaternary ammonium salt, quaternary phosphonium salt, guanidine, biguanide, pyridine, imidazole, isothiazolinone, phenol, or the derivatives of the said substances; or 2) the anti-mildew agent with active ingredient, such as $Ag^+$, $Cu^{2+}$, $Zn^{2+}$; or 3) active oxide, such as ZnO, $TiO_2$.

The hydrophobic agent (water-proofing agent) can be organic silicon, such as methyl silanol sodium salt.

The coalescent means a film forming material which can improve the coalescing performance, so that the inorganic dry-powdered architectural paint of the present invention can be suitable in a wide temperature range. The coalescent can be diatomic alcohol, diatomic alcohol monoether, diatomic alcohol monoether carboxylate ester and so on, such as ethylene glycol, propylene glycol monobutyl ether, propylene 1-methoxy-2-propyl acetate ester, 2,2,4-trimethyl-1,3-pentanediol monobutyl ether. According to an embodiment of the said inorganic dry-powdered architectural paint of the present invention, the following components are included with the following weight ratio:

| | |
|---|---|
| alkali metal silicate | 50-400; |
| hardening agent | 1-100; |
| re-dispersible emulsion powder | 20-250; | optionally, the following components are also included with the following weight ratio:

| | |
|---|---|
| pigment | 0-300; and/or |
| filler | 300-700; and/or |
| auxiliary | 0-20. |

According to another embodiment of the said inorganic dry-powdered architectural paint of the present invention, the following components are included with the following weight ratio:

| | |
|---|---|
| alkali metal silicate | 100-350; |
| hardening agent | 3-80; |
| re-dispersible emulsion powder | 30-200; | optionally, the following components are also included with the following weight ratio:

| | |
|---|---|
| pigment | 0-250; and/or |
| filler | 350-600; and/or |
| auxiliary | 1-15. |

According to another embodiment of the said inorganic dry-powdered architectural paint of the present invention, the following components are included with the following weight ratio:

| | |
|---|---|
| alkali metal silicate | 100-250; |
| hardening agent | 5-50; |
| re-dispersible emulsion powder | 50-150; | optionally, the following components are also included with the following weight ratio:

| | |
|---|---|
| pigment | 0-150; and/or |
| filler | 400-550; and/or |
| auxiliary | 2-10. |

According to another embodiment of the said inorganic dry-powdered architectural paint of the present invention, the following components are included with the following weight ratio:

| | |
|---|---|
| alkali metal silicate | 100-150; |
| hardening agent | 10-30; |
| re-dispersible emulsion powder | 70-120; | optionally, the following components are also included with the following weight ratio:

| | |
|---|---|
| pigment | 50-100; and/or |
| filler | 450-500; and/or |
| auxiliary | 5-7. |

The second aspect of the present invention provides a method of producing the said inorganic dry-powdered architectural paint, including the following steps: the alkali metal silicate, the hardening agent and the re-dispersible emulsion powder are dry mixed, optionally, together with the pigment powder, and/or the filler powder, and/or the auxiliary powder, to obtain the inorganic dry-powdered architectural paint.

In the method of the second aspect, the alkali metal silicate, the hardening agent, the re-dispersible emulsion powder, the pigment, the filler, the auxiliary, and their weigh ratio has been described above.

Some analytical measurements show that the inorganic dry-powdered architectural paint, when being mixed with water and coated onto buildings, has advantages of cleaning resistance and weather resistance without whitening phenomenon, and meets the Chinese standard JG/T26-2002, i.e. overcomes the problem of bad cleaning resistance and weather resistance existing in pure emulsion powdered paint, and overcomes the whitening phenomenon being existing in cement or lime based powdered paint.

According to Chinese standard GB/18582-2008, no VOC (volatile organic compound) has been found, so that the inorganic dry-powdered architectural paint is environmentally friendly.

Further more, the inorganic dry-powdered architectural paint of the present invention can be produced and used conveniently, with a low cost.

DETAILED DESCRIPTION OF THE INVENTION

The inorganic dry-powdered architectural paint of the present invention includes:
1) alkali metal silicate salt, can be metal silicate salt, wherein, the metal is selected from IA group in Mendeleev's periodic table; such as one or mixture of several of sodium silicate, potassium silicate and lithium silicate;
2) hardening agent, includes one or mixture of several of fluorosilicate, phosphate (including condensed phosphate salt), borate, metallic oxide and metal hydroxide;
   wherein, the metal in said metallic oxide and metal hydroxide is selected form IA, IIA, IIIA, IIB and IB groups in Mendeleev's periodic table;
   wherein, the said fluorosilicate, phosphate, borate are metal salts, wherein, the metal is selected form IA, IIA, IIIA, IIB and IB groups in Mendeleev's periodic table;
   wherein, the examples of the hardening agent includes one or mixture of several of $Al_2O_3$, ZnO, MgO, sodium fluorosilicate, potassium fluorosilicate, lithium fluorosilicate, magnesium fluorosilicate, aluminum fluorosilicate, aluminum phosphate, potassium phosphate, sodium phosphate, magnesium phosphate, condensed aluminum phosphate, aluminum borate, potassium borate, sodium borate, magnesium borate;
   wherein, the components 1) and 2) form an inorganic gel system;
3) re-dispersible emulsion powder, wherein, the re-dispersible is obtained from polymer emulsion by drying, and the polymer can be one or mixture of several homo-polymer, binary copolymer and ternary copolymer of alkene, alkadiene, acrylic acid, acrylate ester, methacrylic acid, methacrylate ester or vinyl aliphatate ester; wherein, the vinyl aliphatate ester is represented by $R-CO-O-CH=CH_2$, and the R is hydrocarbonyl, preferably is alkyl, more preferably is straight or branched C1-C20 alkyl; the example of the polymer includes poly(vinyl acetate), vinyl acetate/ethylene copolymer (EVA), vinyl acetate/propylene copolymer, vinyl acetate/butadiene copolymer, vinyl acetate/styrene copolymer, styrene/butadiene copolymer, acrylate/styrene copolymer, acrylate ester/vinyl acetate/vinyl higher aliphatate ester copolymer, vinyl acetate/higher aliphatate ester copolymer, ethylene/vinyl chloride/vinyl laurate ester copolymer, vinyl acetate/ethylene/vinyl higher aliphatate ester copolymer, poly(acrylic acid), poly(acrylate ester), poly(methacrylic acid), poly(mathacrylate ester), and so on.

The three components above-mentioned are key ingredient of the inorganic dry-powdered architectural paint of the present invention. However, the components 4) filler and/or 5) pigment can be added:
4) filler, used for improving the strength of the inorganic dry-powdered architectural paint, wherein, the filler can be inorganic filler, preferably, including one or mixture of several of silicon oxide, silicate salt, carbonate salt, carbide, sulfate, sulfide, nitride, metal oxide, metal hydroxide and metal; for example, silicon nitride, boron nitride, wollastonite, aluminum oxide, barium sulfate, calcium carbonate (can be light calcium carbonate or ground calcium carbonate), talcum powder, mica powder, bentonite, sierozem powder, aluminum silicate (prefer to ultra-fine aluminum silicate), quartz powder, calcite, and so on:
5) pigment, used for providing required colour for the inorganic dry-powdered architectural paint, wherein, the pigment can be organic or inorganic pigment with white or light colour, or any other colour. The example of inorganic pigment is, such as, titanium pigment, iron oxide red, iron oxide yellow, iron oxide black, lithopone (coprecipitate of zinc sulfide and barium sulfate), carbon black, cadmium red, cadmium yellow, lead chromium yellow, chromium oxide green, iron blue, zinc oxide, cobalt blue. The example of the organic pigment is, such as, the pigment with structure of phthalocyanin, azo type pigment, the pigment with structure of quinacridinone.

However, according to the requirement, an auxiliary which is suitable for paint can be added, such as defoaming agents, dispersing agent, thickening agent, wetting agent, coalescent, anti-mildew agent, hydrophobic agent.

The inorganic dry-powdered architectural paint can be obtained from the above-mentioned components by dry mixing. To obtain a good property of the inorganic dry-powdered architectural paint, the weight ratio of the above-mentioned components is:

| | |
|---|---|
| alkali metal silicate | 50-400; |
| hardening agent | 1-100; |
| re-dispersible emulsion powder | 20-250; and, optionally, |
| pigment | 0-300; and/or |
| filler | 300-700; and/or |
| auxiliary | 0-20. |

More preferably, the weight ratio of the above-mentioned components is:

| | |
|---|---|
| alkali metal silicate | 100-350; |
| hardening agent | 3-80; |
| re-dispersible emulsion powder | 30-200; and, optionally, |
| pigment | 0-250; and/or |
| filler | 350-600; and/or |
| auxiliary | 1-15. |

More preferably, the weight ratio of the above-mentioned components is:

| | |
|---|---|
| alkali metal silicate | 100-250; |
| hardening agent | 5-50; |
| re-dispersible emulsion powder | 50-150; and, optionally, |
| pigment | 0-150; and/or |
| filler | 400-550; and/or |
| auxiliary | 2-10. |

Most preferably, the weight ratio of the above-mentioned components is:

| | |
|---|---|
| alkali metal silicate | 100-150; |
| hardening agent | 10-30; |
| re-dispersible emulsion powder | 70-120; and, optionally, |
| pigment | 50-100; and/or |
| filler | 450-500; and/or |
| auxiliary | 5-7. |

The inorganic dry-powdered architectural paint of the present invention and the method of producing the same will be described in more detailed in the following examples, to make the present invention to be more comprehensible. However, it should not be understand that the following examples will limit the scope of the present invention.

Example 1 (Exq1)

In this example, the components are:

| | |
|---|---|
| potassium silicate | 100 g; |
| aluminum phosphate | 5 g; |
| EVA re-dispersible emulsion powder | 50 g; |
| $CaCO_3$ | 400 g; |
| defoaming agent | 1 g; |
| thickening agent | 1 g. |

The above-mentioned components are dry mixed to obtain the inorganic dry-powdered architectural paint. The obtained paint is added into water and stirred. Then the mixture is operated for spray coating or brush coating. The property of the coating is measured according to the China Construction Industry Standard JG/T 26-2002, "Inorganic Building Coating for External Wall", and the amount of VOC is measured according to China standard GB 18582-2008, "Indoor Decorating and Refurbishing Materials—Limit of Harmful substances of interior architectural coatings". The measurement results are list in table 1 and table 2 separately.

Example 2 (Exq2)

In this example, the components are:

| | |
|---|---|
| potassium silicate | 250 g; |
| aluminum phosphate | 50 g; |
| EVA re-dispersible emulsion powder | 150 g; |
| $TiO_2$ | 150 g; |
| $CaCO_3$ | 550 g; |
| defoaming agent | 5 g; |
| thickening agent | 5 g. |

The above-mentioned components are dry mixed to obtain the inorganic dry-powdered architectural paint. The obtained paint is added into water and stirred. Then the mixture is operated for spray coating or brush coating. The property of the coating is measured according to the China Construction Industry Standard JG/T 26-2002, "Inorganic Building Coating for External Wall", and the amount of VOC is measured according to China standard GB 18582-2008, "Indoor Decorating and Refurbishing Materials—Limit of Harmful substances of interior architectural coatings". The measurement results are list in table 1 and table 2 separately.

Example 3 (Exq3)

In this example, the components are:

| | |
|---|---|
| sodium silicate | 233 g; |
| ZnO | 46 g; |
| EVA re-dispersible emulsion powder | 134 g; |
| iron oxide yellow | 128 g; |
| wollastonite | 534 g; |
| defoaming agent | 3 g; |
| thickening agent | 2 g. |

The above-mentioned components are dry mixed to obtain the inorganic dry-powdered architectural paint. The obtained paint is added into water and stirred. Then the mixture is operated for spray coating or brush coating. The property of the coating is measured according to the China Construction Industry Standard JG/T 26-2002, "Inorganic Building Coating for External Wall", and the amount of VOC is measured according to China standard GB 18582-2008, "Indoor Decorating and Refurbishing Materials—Limit of Harmful substances of interior architectural coatings". The measurement results are list in table 1 and table 2 separately.

Example 4 (Exq4)

In this example, the components are:

| | |
|---|---|
| lithium silicate | 108 g; |
| sodium fluorosilicate | 12 g; |
| EVA re-dispersible emulsion powder | 63 g; |
| iron oxide red | 51 g; |
| bentonite | 430 g; |
| defoaming agent | 1 g; |
| thickening agent | 2 g. |

The above-mentioned components are dry mixed to obtain the inorganic dry-powdered architectural paint. The obtained paint is added into water and stirred. Then the mixture is operated for spray coating or brush coating. The property of the coating is measured according to the China Construction Industry Standard JG/T 26-2002, "Inorganic Building Coating for External Wall", and the amount of VOC is measured according to China standard GB 18582-2008, "Indoor Decorating and Refurbishing Materials—Limit of Harmful substances of interior architectural coatings". The measurement results are list in table 1 and table 2 separately.

Example 5 (Exq5)

In this example, the components are:

| | |
|---|---|
| sodium silicate | 135 g; |
| magnesium fluorosilicate | 27 g; |
| EVA re-dispersible emulsion powder | 86 g; |
| ZnO | 43 g; |
| wollastonite | 453 g; |
| defoaming agent | 2 g; |
| thickening agent | 2 g. |

The above-mentioned components are dry mixed to obtain the inorganic dry-powdered architectural paint. The obtained paint is added into water and stirred. Then the mixture is operated for spray coating or brush coating. The property of the coating is measured according to the China Construction Industry Standard JG/T 26-2002, "Inorganic Building Coating for External Wall", and the amount of VOC is measured according to China standard GB 18582-2008, "Indoor Decorating and Refurbishing Materials—Limit of Harmful substances of interior architectural coatings". The measurement results are list in table 1 and table 2 separately.

Example 6 (Exq6)

In this example, the components are:

| | |
|---|---|
| potassium silicate | 161 g; |
| condensed aluminum phosphate | 40 g; |
| EVA re-dispersible emulsion powder | 103 g; |
| $TiO_2$ | 85 g; |
| $CaCO_3$ | 515 g; |
| defoaming agent | 2 g; |
| thickening agent | 2 g. |

The above-mentioned components are dry mixed to obtain the inorganic dry-powdered architectural paint. The obtained paint is added into water and stirred. Then the mixture is operated for spray coating or brush coating. The property of the coating is measured according to the China Construction Industry Standard JG/T 26-2002, "Inorganic Building Coating for External Wall", and the amount of VOC is measured according to China standard GB 18582-2008, "Indoor Decorating and Refurbishing Materials—Limit of Harmful substances of interior architectural coatings". The measurement results are list in table 1 and table 2 separately.

Example 7 (Exq7)

In this example, the components are:

| | |
|---|---|
| potassium silicate | 183 g; |
| potassium fluorosilicate | 37 g; |
| EVA re-dispersible emulsion powder | 122 g; |
| $TiO_2$ | 114 g; |
| $CaCO_3$ | 511 g; |
| defoaming agent | 2 g; |
| thickening agent | 2 g. |

The above-mentioned components are dry mixed to obtain the inorganic dry-powdered architectural paint. The obtained paint is added into water and stirred. Then the mixture is operated for spray coating or brush coating. The property of the coating is measured according to the China Construction Industry Standard JG/T 26-2002, "Inorganic Building Coating for External Wall", and the amount of VOC is measured according to China standard GB 18582-2008, "Indoor Decorating and Refurbishing Materials—Limit of Harmful substances of interior architectural coatings". The measurement results are list in table 1 and table 2 separately.

Example 8 (Exq8)

In this example, the components are:

| | |
|---|---|
| potassium silicate | 205 g; |
| aluminum phosphate | 23 g; |
| EVA re-dispersible emulsion powder | 92 g; |
| $TiO_2$ | 94 g; |
| $CaCO_3$ | 500 g; |
| defoaming agent | 2 g; |
| thickening agent | 2 g. |

The above-mentioned components are dry mixed to obtain the inorganic dry-powdered architectural paint. The obtained paint is added into water and stirred. Then the mixture is operated for spray coating or brush coating. The property of the coating is measured according to the China Construction Industry Standard JG/T 26-2002, "Inorganic Building Coating for External Wall", and the amount of VOC is measured according to China standard GB 18582-2008, "Indoor Decorating and Refurbishing Materials—Limit of Harmful substances of interior architectural coatings". The measurement results are list in table 1 and table 2 separately.

Example 9 (Exq9)

In this example, the components are:

| | |
|---|---|
| potassium silicate | 233 g; |
| aluminum phosphate | 47 g; |
| EVA re-dispersible emulsion powder | 136 g; |
| $TiO_2$ | 141 g; |

-continued

| | |
|---|---|
| CaCO₃ | 539 g; |
| defoaming agent | 2 g; |
| thickening agent | 1 g. |

The above-mentioned components are dry mixed to obtain the inorganic dry-powdered architectural paint. The obtained paint is added into water and stirred. Then the mixture is operated for spray coating or brush coating. The property of the coating is measured according to the China Construction Industry Standard JG/T 26-2002, "Inorganic Building Coating for External Wall", and the amount of VOC is measured according to China standard GB 18582-2008, "Indoor Decorating and Refurbishing Materials— Limit of Harmful substances of interior architectural coatings". The measurement results are list in table 1 and table 2 separately.

Example 10 (Exq10)

In this example, the components are:

| | |
|---|---|
| potassium silicate | 242 g; |
| aluminum phosphate | 41 g; |
| EVA re-dispersible emulsion powder | 147 g; |
| TiO₂ | 101 g; |
| CaCO₃ | 501 g; |
| defoaming agent | 1 g; |
| thickening agent | 2 g. |

The above-mentioned components are dry mixed to obtain the inorganic dry-powdered architectural paint. The obtained paint is added into water and stirred. Then the mixture is operated for spray coating or brush coating. The property of the coating is measured according to the China Construction Industry Standard JG/T 26-2002, "Inorganic Building Coating for External Wall", and the amount of VOC is measured according to China standard GB 18582-2008, "Indoor Decorating and Refurbishing Materials— Limit of Harmful substances of interior architectural coatings". The measurement results are list in table 1 and table 2 separately.

Example 11 (Exq11)

In this example, the components are:

| | |
|---|---|
| potassium silicate | 285 g; |
| sodium fluorosilicate | 51 g; |
| poly(acrylate ester) re-dispersible emulsion powder | 197 g; |
| iron oxide black | 200 g; |
| talcum powder | 560 g; |
| defoaming agent | 1 g; |
| thickening agent | 2 g. |

The above-mentioned components are dry mixed to obtain the inorganic dry-powdered architectural paint. The obtained paint is added into water and stirred. Then the mixture is operated for spray coating or brush coating. The property of the coating is measured according to the China Construction Industry Standard JG/T 26-2002, "Inorganic Building Coating for External Wall", and the amount of VOC is measured according to China standard GB 18582-2008, "Indoor Decorating and Refurbishing Materials— Limit of Harmful substances of interior architectural coatings". The measurement results are list in table 1 and table 2 separately.

Example 12 (Exq12)

In this example, the components are:

| | |
|---|---|
| potassium silicate | 314 g; |
| magnesium fluorosilicate | 66 g; |
| PMMA re-dispersible emulsion powder | 173 g; |
| lithopone powder | 232 g; |
| calcite | 594 g; |
| defoaming agent | 1 g; |
| thickening agent | 2 g. |

The above-mentioned components are dry mixed to obtain the inorganic dry-powdered architectural paint. The obtained paint is added into water and stirred. Then the mixture is operated for spray coating or brush coating. The property of the coating is measured according to the China Construction Industry Standard JG/T 26-2002, "Inorganic Building Coating for External Wall", and the amount of VOC is measured according to China standard GB 18582-2008, "Indoor Decorating and Refurbishing Materials— Limit of Harmful substances of interior architectural coatings". The measurement results are list in table 1 and table 2 separately.

Example 13 (Exq13)

In this example, the components are:

| | |
|---|---|
| lithium silicate | 350 g; |
| magnesium phosphate | 80 g; |
| vinyl acetate/ethylene copolymer re-dispersible emulsion powder | 200 g; |
| 2,9-dimethylquinacridinone | 250 g; |
| boron nitride | 600 g; |
| defoaming agent | 15 g; |
| thickening agent | 15 g. |

The above-mentioned components are dry mixed to obtain the inorganic dry-powdered architectural paint. The obtained paint is added into water and stirred. Then the mixture is operated for spray coating or brush coating. The property of the coating is measured according to the China Construction Industry Standard JG/T 26-2002, "Inorganic Building Coating for External Wall", and the amount of VOC is measured according to China standard GB 18582-2008, "Indoor Decorating and Refurbishing Materials— Limit of Harmful substances of interior architectural coatings". The measurement results are list in table 1 and table 2 separately.

Example 14 (Exq14)

In this example, the components are:

| | |
|---|---|
| sodium silicate | 100 g; |
| potassium fluorosilicate | 3 g; |
| styrene/butadiene copolymer re-dispersible emulsion powder | 30 g; |
| silicon carbide | 350 g; |
| defoaming agent | 10 g; |
| thickening agent | 10 g. |

The above-mentioned components are dry mixed to obtain the inorganic dry-powdered architectural paint. The obtained paint is added into water and stirred. Then the mixture is operated for spray coating or brush coating. The property of the coating is measured according to the China Construction Industry Standard JG/T 26-2002, "Inorganic Building Coating for External Wall", and the amount of VOC is measured according to China standard GB 18582-2008, "Indoor Decorating and Refurbishing Materials—Limit of Harmful substances of interior architectural coatings". The measurement results are list in table 1 and table 2 separately.

Example 15 (Exq15)

In this example, the components are:

| | |
|---|---|
| lithium silicate | 50 g; |
| $Al_2O_3$ | 1 g; |
| poly(methacrylic acid) re-dispersible emulsion powder | 20 g; |
| mica powder | 300 g; |
| defoaming agent | 10 g; |
| thickening agent | 10 g. |

The above-mentioned components are dry mixed to obtain the inorganic dry-powdered architectural paint. The obtained paint is added into water and stirred. Then the mixture is operated for spray coating or brush coating. The property of the coating is measured according to the China Construction Industry Standard JG/T 26-2002, "Inorganic Building Coating for External Wall", and the amount of VOC is measured according to China standard GB 18582-2008, "Indoor Decorating and Refurbishing Materials—Limit of Harmful substances of interior architectural coatings". The measurement results are list in table 1 and table 2 separately.

Example 16 (Exq16)

In this example, the components are:

| | |
|---|---|
| lithium silicate | 80 g; |
| MgO | 3 g; |
| poly(acrylic acid) re-dispersible emulsion powder | 20 g; |
| pigment red 114 | 300 g; |
| Barium sulfate | 320 g; |
| defoaming agent | 15 g; |
| thickening agent | 15 g. |

The above-mentioned components are dry mixed to obtain the inorganic dry-powdered architectural paint. The obtained paint is added into water and stirred. Then the mixture is operated for spray coating or brush coating. The property of the coating is measured according to the China Construction Industry Standard JG/T 26-2002, "Inorganic Building Coating for External Wall", and the amount of VOC is measured according to China standard GB 18582-2008, "Indoor Decorating and Refurbishing Materials—Limit of Harmful substances of interior architectural coatings". The measurement results are list in table 1 and table 2 separately.

Example 17 (Exq17)

In this example, the components are:

| | |
|---|---|
| lithium silicate | 400 g; |
| sodium boronate | 100 g; |
| ethylene/vinyl chloride/vinyl laurate ester copolymer re-dispersible emulsion powder | 250 g; |
| phthalocyanine blue | 300 g; |
| $CaCO_3$ | 700 g; |
| defoaming agent | 15 g; |
| thickening agent | 15 g. |

The above-mentioned components are dry mixed to obtain the inorganic dry-powdered architectural paint. The obtained paint is added into water and stirred. Then the mixture is operated for spray coating or brush coating. The property of the coating is measured according to the China Construction Industry Standard JG/T 26-2002, "Inorganic Building Coating for External Wall", and the amount of VOC is measured according to China standard GB 18582-2008, "Indoor Decorating and Refurbishing Materials—Limit of Harmful substances of interior architectural coatings". The measurement results are list in table 1 and table 2 separately.

TABLE 1 physical properties of the paint obtained in Exq1-17 and the coatings from the same

| Item | technical requirement | result | conclusion |
|---|---|---|---|
| State in container | After stirring, no block appears, and shows homogeneous stat | conformance to the requirement | Qualified |
| Workability | Brush two accessibility | conformance to the requirement | Qualified |
| Apperance of coating | The appearance of the film is normal | conformance to the requirement | Qualified |
| hot storage stability (30 days) | No blocking, coacervation and mildwing phenomenon | conformance to the requirement | Qualified |
| Low temperature storage stability (3 times) | No blocking and coacervation phenomenon | conformance to the requirement | Qualified |
| Drying time (surface drying), hour | ≤2 | conformance to the requirement | Qualified |
| Cleaning resistanc, time | ≥100 | >10000 | Qualified |
| Water resistance (168 h) | No blister, crack and peeling; powder slightly peeling off is allowed | No change | Qualified |
| Alkali resistance (168 h) | No blister, crack and peeling; powder slightly peeling off is allowed | No change | Qualified |
| Temperature alter resistance (10 times) | No blister, crack and peeling; powder slightly peeling off is allowed | No change | Qualified |
| Dirt resistance, % | ≤20 | 10 | Qualified |
| resistance to artificial weathering, hour | No blister, crack, peeling, and powdering | 500 | |

TABLE 2 measurement results of harmful substance from the paint obtained in Exq1-17 and the coatings from the same

| Item | | technical requirement | result | conclusion |
|---|---|---|---|---|
| VOC, g/L | | ≤120 | Not detected | Qualified |
| free-formaldehyde, mg/L | | ≤100 | Not detected | Qualified |
| Heavy metal | Soluble Lead (Pb), mg/kg | ≤90 | Not detected | Qualified |
| | Soluble Cadmium (Cd), mg/kg | ≤75 | Not detected | Qualified |
| | Soluble Chromium (Cr), mg/kg | ≤60 | Not detected | Qualified |
| | Soluble mercury (Hg), mg/kg | ≤60 | Not detected | Qualified |
| Total of benzene, toluene, ethylbenzene and xylene, mg/kg | | ≤300 | Not detected | Qualified |

From table 1, it can be seen that the cleaning resistance measurement of the inorganic dry-powdered architectural paint of the present invention is more than 10000 times, far beyond the regulation, 1000 times, of standard JG/T 26-2002. Through tests of water resistance (168 h), alkali resistance (168 h) and temperature alter resistance (10 times), it can be seen that the storage stability, dirt resistance and workability can meet the standard JG/T 26-2002.

Meanwhile, during the measurements and practical application, no salt separating out and whitening occurs from the inorganic dry-powdered architectural paint of the present invention.

From table 2, it can be seen that, during applications, no harmful substance, such as VOC, heavy metal, benzene and formaldehyde, is generated from the inorganic dry-powdered architectural paint of the present invention, so that the paint of the present invention is environment friendly.

It should be understood that the description of the embodiments above is only the illustrations of the present invention, and it does not limit the present invention to the specific embodiments illustrated. Numerous other ways of carrying out the method provided by the present invention may be devised by the skilled in the art without departing from the scope of the invention, and they are thus encompassed by the present invention. Therefore, it should be understood that any identical shift or modification can be done without departing from the spirit and the scope of the present invention.

What is claimed is:

1. An inorganic dry-powdered architectural paint, wherein the inorganic dry powdered architectural paint comprises:
    an alkali metal silicate comprising lithium silicate;
    a hardening agent; and
    an organic re-dispersible emulsion powder;
    wherein the hardening agent is selected from substances that form an inorganic gel system with the alkali metal silicate;
    wherein the organic re-dispersible emulsion powder is prepared from a polymer emulsion by drying;
    wherein the polymer is one or a mixture of several of homopolymer, binary copolymer, ternary copolymer from alkene, alkadiene, acrylic acid, acrylic ester, methacrylic acid, methacrylate ester and vinyl aliphatate ester;
    wherein the vinyl aliphatate ester is represented by R—CO—O—CH=CH$_2$, and the R is straight or branched C1-C20 alkyl; and
    wherein the hardening agent comprises one or a mixture of several of Al$_2$O$_3$, ZnO, MgO, sodium fluorosilicate, potassium fluorosilicate, lithium fluorosilicate, magnesium fluorosilicate, aluminum fluorosilicate.

2. The inorganic dry-powdered architectural paint according claim 1, wherein a weight ratio of the alkali metal silicate, the hardening agent, and the re-dispersible emulsion powder is:

| | |
|---|---|
| alkali metal silicate | 50-400; |
| hardening agent | 1-100; and |
| re-dispersible emulsion powder | 20-250. |

3. The inorganic dry-powdered architectural paint according to claim 1, wherein the inorganic dry-powdered architectural paint further contains filler and/or pigment.

4. The inorganic dry-powdered architectural paint according to claim 3, wherein the filler contains one or a mixture of several of silicon oxide, silicate salt, carbonate salt, carbide, sulfate, sulfide, nitride, metal oxide, metal hydroxide and metal.

5. The inorganic dry-powdered architectural paint according to claim 3, wherein the pigment contains one or a mixture of several of titanium pigment, iron oxide red, iron oxide yellow, iron oxide black, lithopone, carbon black, cadmium red, cadmium yellow, lead chromium yellow, chromium oxide green, iron blue, zinc oxide, cobalt blue, and the pigment with a structure of phthalocyanin, azo type pigment, the pigment with a structure of quinacridinone.

6. The inorganic dry-powdered architectural paint according to claim 3, wherein a weight ratio of the components is:

| | |
|---|---|
| alkali metal silicate | 50-400; |
| hardening agent | 1-100; |
| re-dispersible emulsion powder | 20-250; |
| pigment | 0-300; and/or |
| filler | 300~700. |

7. The inorganic dry-powdered architectural paint according to claim 1, wherein the inorganic dry-powdered architectural paint further contains an auxiliary suitable for paint field.

8. The inorganic dry-powdered architectural paint according to claim 7, wherein a weight ratio of the components is:

| | |
|---|---|
| alkali metal silicate | 50-400; |
| hardening agent | 1-100; |
| re-dispersible emulsion powder | 20-250; |
| pigment | 0-300; and/or |
| filler | 300~700; and/or |
| auxiliary | 0~20. |

9. A method of producing the inorganic dry-powdered architectural paint according to claim 1, wherein the alkali metal silicate, the hardening agent and there-dispersible emulsion powder are dry mixed, optionally, together with a pigment powder, and/or a filler powder, and/or an auxiliary powder.

10. The inorganic dry-powdered architectural paint according to claim 1,
    wherein the polymer is a binary copolymer or ternary copolymer, and
    wherein the binary copolymer or ternary copolymer is formed from alkene, alkadiene, acrylic acid, or acrylic ester.

11. The inorganic dry-powdered architectural paint according to claim 1,
wherein the polymer is a binary copolymer or ternary copolymer, and
wherein the binary copolymer or ternary copolymer is formed from alkene, or alkadiene.

12. The inorganic dry-powdered architectural paint according to claim 1, wherein the polymer is poly(acrylate ester).

13. The inorganic dry-powdered architectural paint according to claim 1, wherein the polymer is PMMA (poly(methyl methacrylic acid).

14. The inorganic dry-powdered architectural paint according to claim 1, wherein the polymer is vinyl acetate/ethylene copolymer.

15. The inorganic dry-powdered architectural paint according to claim 1, wherein the polymer is styrene/butadiene copolymer.

16. The inorganic dry-powdered architectural paint according to claim 1, wherein the polymer is poly(acrylic acid).

17. The inorganic dry-powdered architectural paint according to claim 1, wherein the polymer is ethylene/vinyl chloride/vinyl laurate copolymer.

* * * * *